United States Patent
Streuber

(10) Patent No.: US 10,634,559 B2
(45) Date of Patent: Apr. 28, 2020

(54) SPECTRALLY-SCANNED HYPERSPECTRAL ELECTRO-OPTICAL SENSOR FOR INSTANTANEOUS SITUATIONAL AWARENESS

(71) Applicant: Raytheon Company, Waltham, MA (US)

(72) Inventor: Casey T. Streuber, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 10 days.

(21) Appl. No.: 15/956,242

(22) Filed: Apr. 18, 2018

(65) Prior Publication Data
US 2019/0323888 A1 Oct. 24, 2019

(51) Int. Cl.
*G01J 3/28* (2006.01)
*H04N 5/232* (2006.01)
(Continued)

(52) U.S. Cl.
CPC .......... *G01J 3/2803* (2013.01); *G01J 3/2823* (2013.01); *G02B 26/007* (2013.01);
(Continued)

(58) Field of Classification Search
None
See application file for complete search history.

(56) References Cited

U.S. PATENT DOCUMENTS 6,552,788 B1 4/2003 Castle

2004/0001201 A1* 1/2004 Knapp .............. G01J 3/14
356/300
(Continued)

FOREIGN PATENT DOCUMENTS

EP 2789999 A1 10/2014
WO 2011138606 A1 11/2011

OTHER PUBLICATIONS

Stubbs et al., "Spectral discrimination in color blind animals via chromatic aberration and pupil shape," PNAS, Jul. 19, 2016, vol. 113, No. 20, pp. 8206-8211.
(Continued)

*Primary Examiner* — Quan Pham
(74) *Attorney, Agent, or Firm* — Eric A. Gifford

(57) ABSTRACT

A spectrally-scanned hyperspectral EO sensor trades the temporal properties of spectral information content for instantaneous situation awareness by capturing an image frame and scanning the spectral scene (wavelength) to build up spectral content. The objective optical system, preferably including a chromatic aberration enhancing device, separates spectral components of the incident radiation. A focus cell is used to adjust a relative axial focus position of the objective optical system with respect to a detector to at least two different axial focus positions to adjust the image position and read out an image frame for a spectrally-weighted component. A processor computes a relative spatial image contrast from a plurality of image frames at different wavelengths as a function of encoded focus cell position. A mechanism may be configured to move the enhancing device in and out of the optical path to form a dual gray-scale and hyperspectral EO sensor. Existing sensors may be retrofit to form the hyperspectral or dual-mode EO sensor.

14 Claims, 12 Drawing Sheets

(51) Int. Cl.
  *H04N 5/217* (2011.01)
  *H04N 5/225* (2006.01)
  *G02B 26/00* (2006.01)
  *G02B 27/00* (2006.01)
(52) U.S. Cl.
  CPC ......... *G02B 27/0068* (2013.01); *H04N 5/217* (2013.01); *H04N 5/2259* (2013.01); *H04N 5/23212* (2013.01)

(56) References Cited

U.S. PATENT DOCUMENTS

| | | | |
|---|---|---|---|
| 2004/0165090 A1* | 8/2004 | Ning | H04N 5/23212 348/272 |
| 2009/0131782 A1* | 5/2009 | Moonen | A61N 7/02 600/411 |
| 2010/0157127 A1* | 6/2010 | Takayanagi | H04N 5/23212 348/333.02 |
| 2011/0050980 A1* | 3/2011 | Sung | G02B 27/0075 348/345 |
| 2011/0273471 A1* | 11/2011 | Nagasaka | H04N 5/23212 345/619 |
| 2011/0279682 A1 | 11/2011 | Li et al. | |
| 2014/0085515 A1* | 3/2014 | Blayvas | H04N 5/2356 348/242 |
| 2015/0181131 A1* | 6/2015 | Kerwien | G06T 5/50 348/239 |
| 2016/0127661 A1 | 5/2016 | Hegyi et al. | |
| 2017/0358190 A1* | 12/2017 | Au | G01N 21/63 |
| 2018/0288340 A1* | 10/2018 | Gillet | G01J 3/513 |

OTHER PUBLICATIONS

Huebschman et al., "Hyperspectral microscopy imaging to analyze pathology samples with multicolors reduces time and cost," Proceedings of SPIE Medical Imaging 1997, Feb. 12, 2009.

Devesse et al., "High Resolution Temperature Measurement of Liquid Stainless Steel Using Hyperspectral Imaging," Sensors, vol. 17, No. 1, Jan. 5, 2017.

* cited by examiner

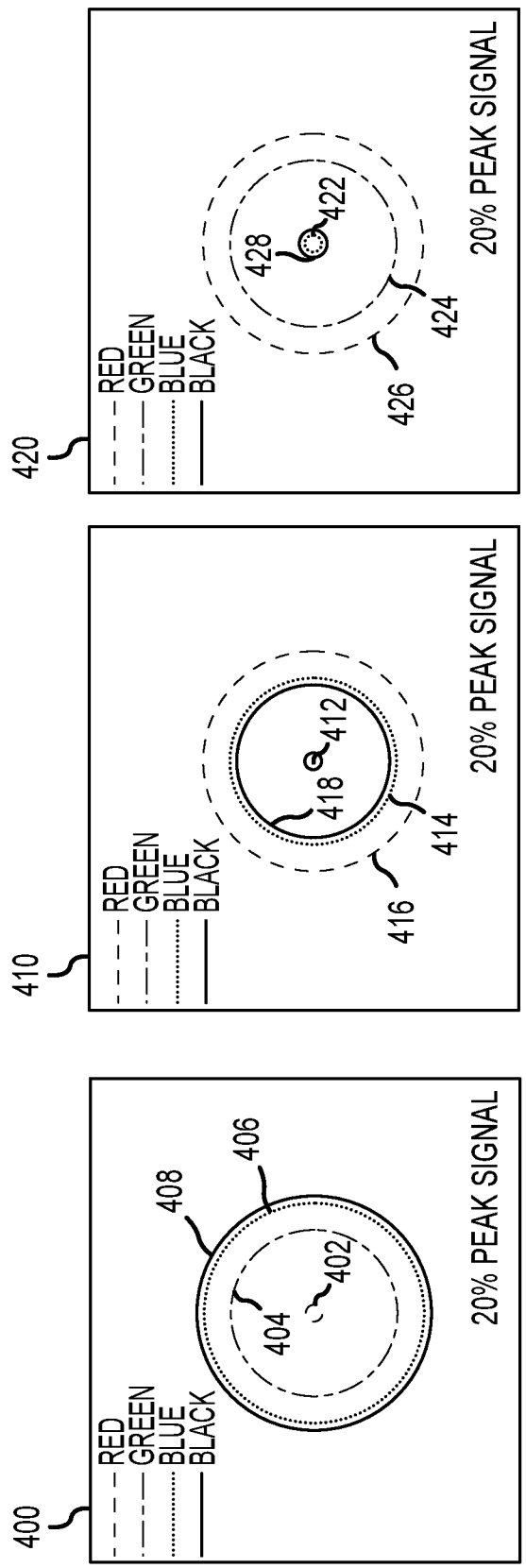

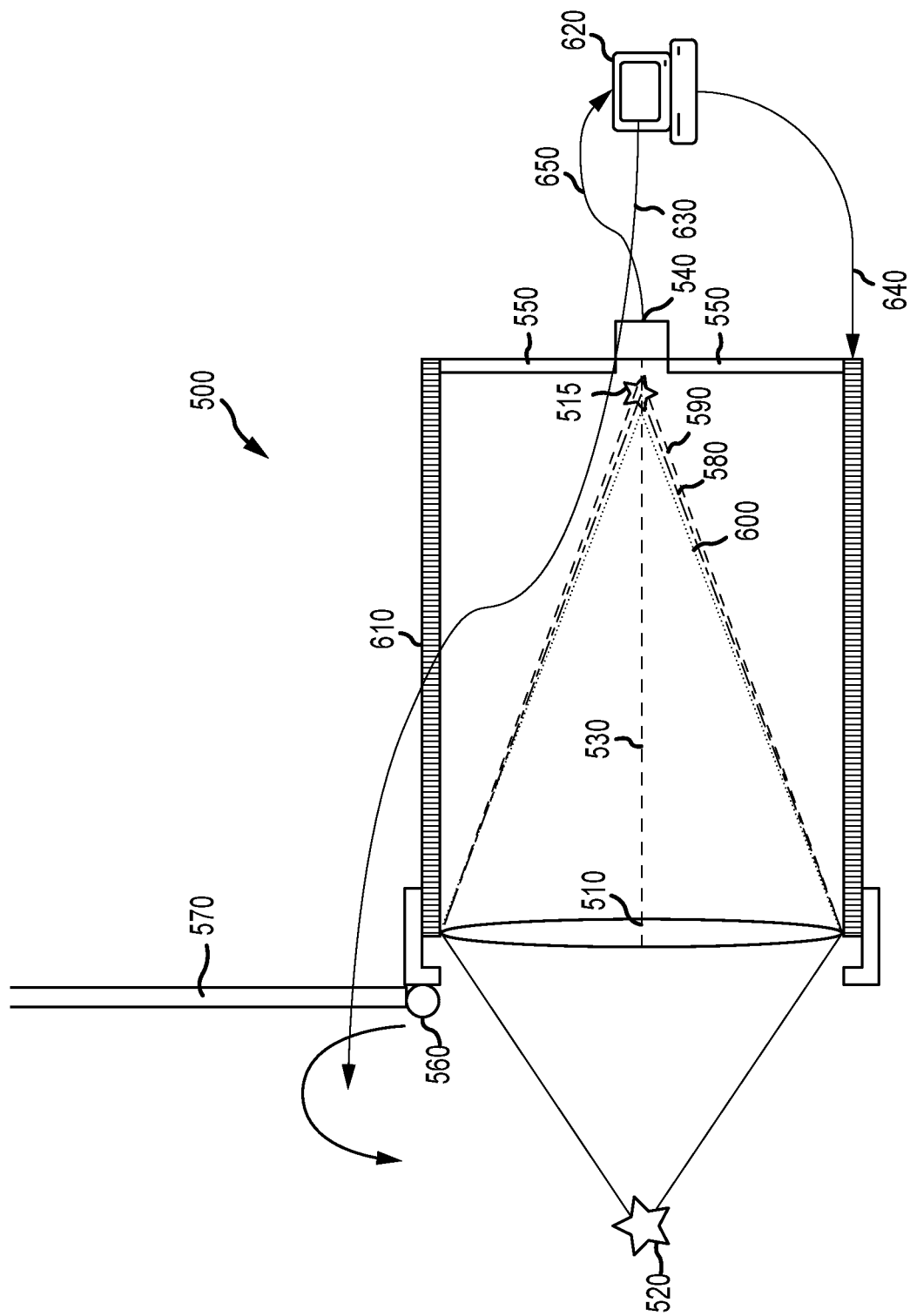

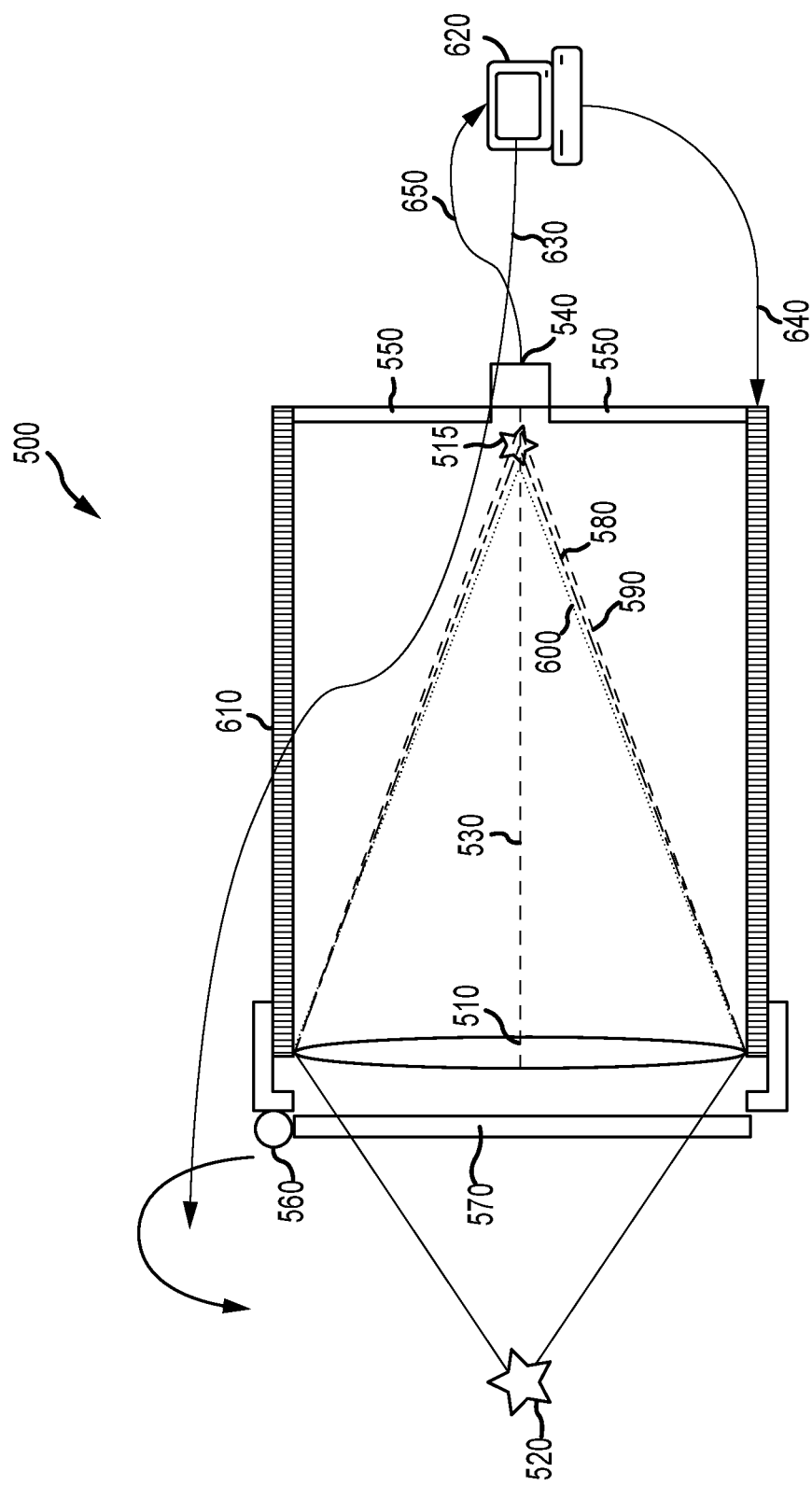

SPECTRALLY-SCANNED HYPERSPECTRAL ELECTRO-OPTICAL SENSOR FOR INSTANTANEOUS SITUATIONAL AWARENESS

BACKGROUND OF THE INVENTION

Field of the Invention

This invention relates to hyperspectral electro-optic (EO) sensors configured to detect both broadband and multi-filtered signatures for instantaneous situational awareness. These hyperspectral EO sensors may be used in guided munitions, guided vehicles, autonomous vehicles, surveillance systems, and microscopy among other applications.

Description of the Related Art

Many guided munitions (e.g. self-propelled missiles, rockets, gun-launched projectiles or aerial bombs) use an electro-optic (EO) sensor to detect and guide the munition to its target. Other applications require that targets (people, vehicles, tanks, animals, bicycles, aircraft, microscopic elements and the like) be detected and identified. The sensor's ability to image a large scene to detect possible targets simultaneously, often referred to as "instantaneous situational awareness", as well as discriminate between those targets is critical.

To accomplish this, the sensor must maintain a field-of-view (FOV) that captures all possible targets as well as enough information about each individual target to determine which targets (if any) are of interest. Inevitably there exists a trade between collecting photons across a large area to ensure detection of possible targets and collecting photons from an individual target (i.e. information). In many cases the sensor designer makes a trade between a broadband/gray-scale system for longer range detection and instantaneous situational awareness versus a target specific (e.g. high-resolution, spectral content, polarimetry) system that provides more information about a particular object in the FOV. Given an available aperture for packaging the EO sensor, the number of photons that can be collected is fixed. A designer selects the focal length of the system along with the detector size and pixel pitch to achieve the optimum distribution of photons for a given task. For example, if the system needs to track multiple objects simultaneously and requires limited information about the targets, a shorter focal length will allow for a larger FOV at the expense of spatial resolution on each individual target. On the other hand, if the application requires detailed information about an object to ensure the right object is targeted, a longer focal length will provide higher spatial resolution (more pixels per target) at the expense of a smaller FOV and less situational awareness. Any EO sensor designer understands this trade well, as selection of these key parameters directly couples to the type of application.

While the design details change with the desired individual target information content (e.g. resolution, spectral content, polarimetry), the fundamental trade between situational awareness and individual target information remains. However, given the need to have both situational awareness and rich target information, clever EO sensor designers will take a balanced approach by distributing these functions since neither can be optimized simultaneously. The traditional design approach is to create an opto-mechanical assembly that scans a narrower FOV (i.e. one with rich target information) across a larger field-of-regard (FOR). This approach trades instantaneous situational awareness for richer target information, but still retains the ability to image a large scene over a longer time period.

In the case of an EO system that requires spectral target information, the trade between situational awareness and target information is even more pronounced than the generic EO sensor imaging system. In a traditional hyperspectral imaging system, an optically dispersive device (e.g. prism or diffraction grating) is used to spread the spectrum of incoming photons in one dimension, while maintaining spatial resolution of the target in the other. Given that the hyperspectral imager is now trading situational awareness with both spectral and spatial resolution information, the opto-mechanical system must continuously scan the FOR, driving complexity and cost into the EO sensor design.

As shown in FIG. 1, a typical hyperspectral imager 8 includes a scanning mirror 20 that moves along one spatial dimension of the target object 10 as a first image is formed at an intermediate image plane 40 via an objective optical system 30. The intermediate image is spatially filtered by a slit aperture 35 that allows one dimension of the image to be transmitted. The intermediate slit image is then collected via a collector lens 60 that collimates the slit image before passing it through a diffractive grating or prism 70. The prism 70 disperses the spectral components of the slit image orthogonal in direction to the long dimension of the slit 50. The dispersed spectral components of the slit image are then re-imaged by a second objective optical system 80 onto a broadband detector 90 at the image plane 100. The image consists of spatial information along one-axis of the detector and spectral information along the other. A complete spatio-spectral image of the target is created through temporally scanning the spatial scene across the target in the direction orthogonal to the long dimension of the slit 35. This approach sacrifices "instantaneous situational awareness" of the entire scene for spectral content on target.

There are two traditional approaches known as the "push-broom" and "whisk-broom" techniques for scanning the spatial scene in these hyperspectral systems. These approaches were developed for airborne and/or satellite reconnaissance missions where the platform the EO sensor resides on is moving in relation to the imaged scene. In the "push-broom" configuration one dimension of a 2-D detector array is used to map spectral information from a line image, and the other is used to record the spatial information. The platform moves in a direction orthogonal to the line image (thus the "push-broom" nomenclature) and the image is built up as the platform itself scans the scene. This approach is relatively simple, only requiring small mechanical motions to maintain image stabilization since the platform motion provides the scan mechanism.

In the "whisk-broom" configuration, the line image is parallel to the direction of platform motion and the image is built by scanning that line orthogonal to the platform motion. Given that the EO sensor is now providing the large motion scanning as well as stabilization of the image for platform motion, these systems are more complex and costly. However, with this approach the image swath is decoupled from the platform (independent from its velocity) as long as the image can be stabilized. In applications where the platform is already fundamentally stable (e.g. microscopy), another approach is used to reduce the cost of the EO sensor, utilizing only a 1-D or line scan detector. In this case the image is scanned in both directions with an even more complex opto-mechanical assembly, while the pixels in the less expensive 1-D detector are used to map spectral information.

What is interesting about these approaches is that they all trade instantaneous situational awareness for target information. This bias is clearly driven by the fact that a hyperspectral imaging sensor utilizes one dimension of the detector for capturing the spectrum of incoming photons and the other for a single dimension of spatial information. In this situation scanning is already required to achieve spatial resolution of a target, so the designer thoughtfully uses the scanning mechanism to build situational awareness with the same mechanism. However, it should be clear that this trade is not always optimal. For instance, one reason hyperspectral sensors have seen little to no use in guided missiles is that this trade presents a fundamental limit to the time period in which full situational awareness is achieved (i.e. it takes a long time to scan the full scene). Given the temporal dynamics within an imaged scene where a missile is either attempting to intercept a traditional airborne platform or another missile itself, it is understandable that rich spectral information about a target might be traded for the speed in which the full scene is imaged. In fact, the most complex EO sensors designed for these situations typically settle for information in only two spectral bands in order to maintain instantaneous situational awareness (no scanning) and spatial resolution. These systems are usually referred to as two-color sensors, collecting spectral information via beam splitters and separate detectors or an expensive detector designed specifically to switch between two spectral bands. The two-color sensor can provide a limited degree of spectral target information, but only if assumptions are made about the type of target a priori.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a spectrally-scanned hyperspectral EO sensor that trades the temporal properties of spectral information content for instantaneous situation awareness by capturing an entire 2D image frame of the scene and scanning the spectral scene (wavelength) to build up spectral content. The trade lies in the acceptance of some spatial resolution degradation in the quality of each image frame as well as a composite gray-scale image due to an image pedestal created from the out of focus spectral components around an image created from the in focus spectral component at any given image frame.

In an embodiment, a spectrally-scanned hyperspectral EO sensor includes an objective optical system that forms an image on an optical axis from incident optical radiation simultaneously collected within a field of view (FOV). The objective optical system separates spectral components of the incident radiation along the optical axis with an axial chromatic aberration of at least f/100 where f is a prime focus position (e.g., a center wavelength of a specified bandwidth) that provides a change in spatial image contrast as a function of position along the optical axis. A broadband detector spaced along the optical axis at nominally the prime focus position converts incident optical radiation into an electrical signal representative of an entire image frame. A focus cell is configured to temporally adjust the relative axial focus position of the objective optical system with respect to the detector to at least two different axial focus positions. This positioning selectively enhances the resolution of a target presented by the wavelength that is optimally focused at that position. The electrical signal is temporally encoded by at least two different axial focus positions and a corresponding image frame. For example, the prime focus position may correspond to a "green wavelength" if the system is operating in the visible electromagnetic band. The focus cell may be adjusted to separately capture image frames at red, green and blue wavelengths to temporally build the spectral content of the image.

In different embodiments, the objective optical system includes an uncorrected objective optical element that separates incident photons based on spectral content. The element may be formed of refractive glass with high optical dispersion (large index of refraction dependence on wavelength) to increase separation. A chromatic aberration enhancing device (CAED) may be added to increase the axial separation of the photons based on spectral content. The enhancing device may be a diffractive optical element such as a binary phase mask, computer generated hologram or kinoform gray-scale diffractive element that produces a wavelength dependent focus shift and resultant transverse axial chromatic aberration blur that is inversely proportional to the power in that element and directly proportional to the normalized spectral bandwidth. In some embodiments, the objective optical system is otherwise achromatic in which case the enhancing device is necessarily included to provide the requisite separation of spectral components.

In different embodiments, the EO sensor includes a processor configured to compute a relative spatial image contrast metric within an image comprising one or more image frames (i.e. an image stack) as a function of encoded focus cell position and the prime focus position for a component of the spectral distribution of the incident optical radiation. This processing transforms changes in spatial resolution, due to artificially enhanced chromatic aberration, into a measure of spectral content in the image. In an embodiment, the processor is configured to compute the relative spatial image contrast metric via a measure of energy on detector (EOD) as a function of focus cell position. EOD is a standard measure of image blur for point source objects. In another embodiment, the processor is configured to compute the relative spatial image contrast metric by segmenting the image into multiple sub-regions and encoding the sub-regions by measuring a relative image blur in each sub-region as a function of the focus cell's axial prime focus position. In an embodiment, the processor is configured to compute the relative spatial image contrast metric to estimate a temperature of an object in the sensor FOV, assuming the target's spectral emissions are driven by Planck's Blackbody Radiation law. In another embodiment, the processor is configured to build (integrate) spectral content from the plurality of image frames to form an estimate of a gray-scale image.

In an embodiment in which the objective optical system is otherwise achromatic, the EO sensor comprises a mechanism configured to move a chromatic aberration enhancing device in and out of an optical path along the optical axis. When the enhancing device is out of the optical path, the focus cell adjusts the relative axial focus to bring the system into focus at the prime focus position such that the electrical signal is encoded with a single gray-scale image frame at the prime focus position. In this position the objective optical system produces a well-corrected image as designed to provide the best resolution possible given the system layout and cost constraints. When the enhancing device is in the optical path, the focus cell temporally adjusts the relative axial focus such that the electrical signal is encoded with a plurality of image frames at different axial focus positions (wavelengths). Each image frame represents a different spectrally-weight image from which an estimate of the gray-scale image can be computed.

In an embodiment, the detector is a single broadband imaging detector whose bandwidth spans the spectral content at the different axial focus positions.

In an embodiment, the objective optical system captures the incident optical radiation over the entire FOV simultaneously to form a corrected high-resolution image frame simultaneously.

In an embodiment, the temporal adjustment of the relative axial focus position constitutes the only scanning in the sensor (the sensor does not include a mechanical scanning mirror).

In an embodiment, an existing gray-scale EO sensor is retrofitted with a CAED to form a hyperspectral EO sensor. The existing focus cell is used to temporally adjust the relative axial focus position to generate the hyperspectral image components. The addition of a mechanical switch to move the CAED in and out of the optical path forms a dual-mode gray-scale and hyperspectral EO sensor. The gray-scale sensor provides a full spatial resolution gray-scale image. The hyperspectral EO sensor provides different spectral image components that exhibit some degree of spatial resolution degradation. Both modes maintain instantaneous situational awareness over the entire FOV.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4a through 4c illustrate notional image pedestals for a point source at axial focus positions corresponding to red, green and blue focus planes;

FIGS. 5a and 5b depict an optical system layout of an embodiment of a spectrally-scanned hyperspectral EO sensor with a chromatic aberration enhancing device (CAED) both in and out of the optical path;

DETAILED DESCRIPTION OF THE INVENTION

Figure 1:
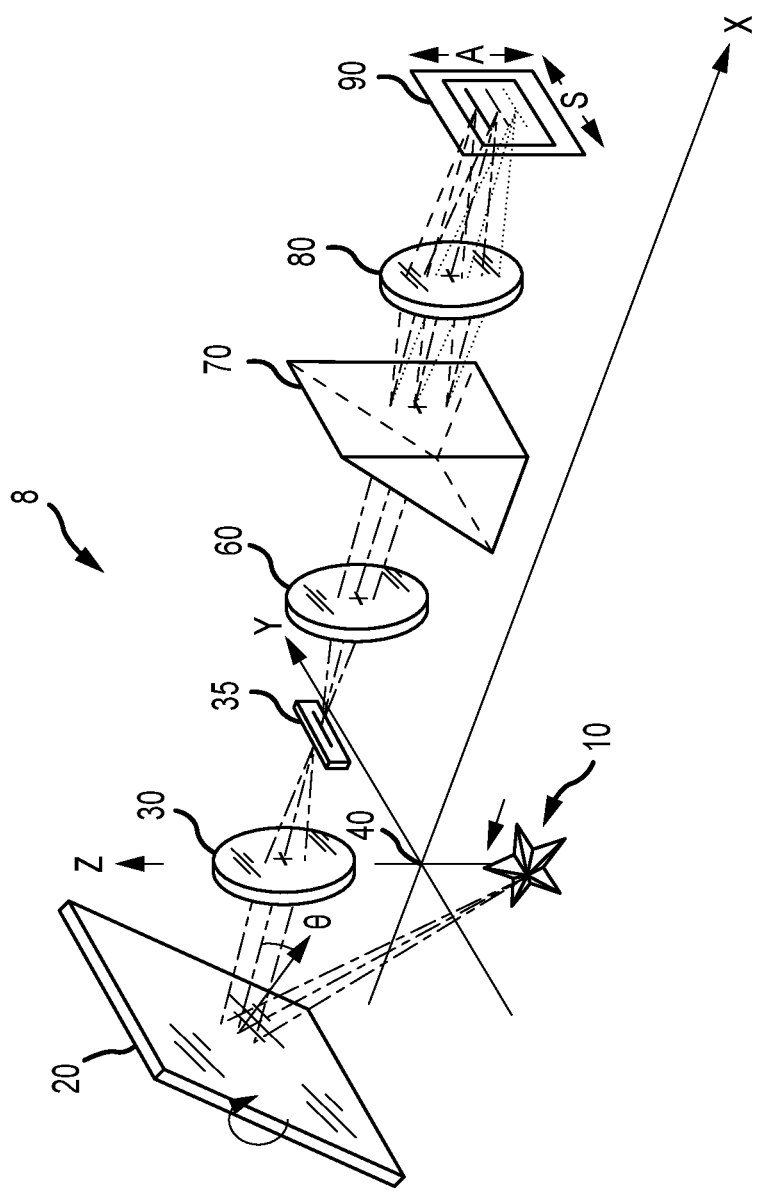
FIG. 1, as described above, is a known embodiment of a spatially-scanned hyperspectral EO sensor.

As objects/targets become increasingly complex and instantaneous situational awareness over the entire FOV is required, it is preferred in many situations that the hyperspectral EO sensor trade the temporal properties of spectral information content for instantaneous situational awareness (i.e. collect an instantaneous 2D image over the scanned spectral scene (wavelength)) rather than scan the spatial scene per convention. To get instantaneous situational awareness we build up spectral content over time and must accept some degradation of individual image frames as well as with the final composite gray-scale image. The trade lies in the acceptance of some spatial resolution degradation due to an image pedestal created from the out of focus spectral components around an image (tightly focused spot) created from the in focus spectral component at any given image frame.

Objective optical systems are typically formed of one or more optical elements made from glass. The index of refraction of any glass varies with wavelength. As such, the optical elements tend to separate the incident photons by spectral content along the optical axis. This property of refractive optical systems is traditionally referred to as chromatic aberration. Optical designers go to great lengths to correct/minimize chromatic aberration. To achieve this correction, optical designers typically couple glasses with disparate powers and dispersion in a doublet form (negative and positive powered lenses bonded together). This concept has been extended over the years with more complex arrangements to balance multiple wavelengths within the spectrum the optical system is designed for. In the simplest case, a designer can achieve a reduction in transverse axial chromatic aberration from df ~f/30 to df ~f/2200, where df is the distance along the optical axis between the prime focus of the blue light and the prime focus of red light in the visible spectrum. This reduction in axial chromatic aberration makes it nearly impossible to perceive changes in optical blur as a function of wavelength. A corrected objective optical system is often referred to as "achromatic".

To implement a hyperspectral EO sensor capable of trading the temporal properties of spectral information content for instantaneous situational awareness, we go against convention and configure the objective optical system to exhibit sufficient chromatic aberration (at least f/100) to separate spectral components of the incident radiation along the optical axis. This may be accomplished in a variety of ways, including adding a chromatic aberration enhancing device (CAED) (e.g. a diffractive optical element) to an achromatic objective optical system or using an uncorrected objective optical system designed to separate spectral components. A focus cell, suitably the focus cell present in the monochromatic EO sensor used to adjust the prime axial focus, is used to temporally adjust a relative axial focus position between the objective optical system and the detector to read-out a full spatial resolution image for a spectrally-weighted component. A processor processes two or more images at different axial focus positions (focus wavelengths) to compute a relative spatial image contrast metric to characterize an object/target in the sensor's FOV. For example, the prime focus position may correspond to a "green" wavelength. The focus cell may be adjusted to separately capture image frames at "red", "green" and "blue" focus wavelengths to temporally build the spectral content of the image. The trade in this approach lies in the acceptance of some degradation in the quality of each R, G, B image frame and the composite gray-scale image. This "spectrally-scanned" hyperspectral EO sensor provides full spatial resolution hyperspectral images at significantly reduced cost and volume compared to the spatially-scanned counterparts by eliminating the mechanical scanning mirror and corresponding optics. The trade-off for this reduced cost/volume and improved instantaneous situational awareness is a decrease in spatial resolution due to the increased blur from out of focus spectrally-weighted components at different detector positions.

Figure 2A:
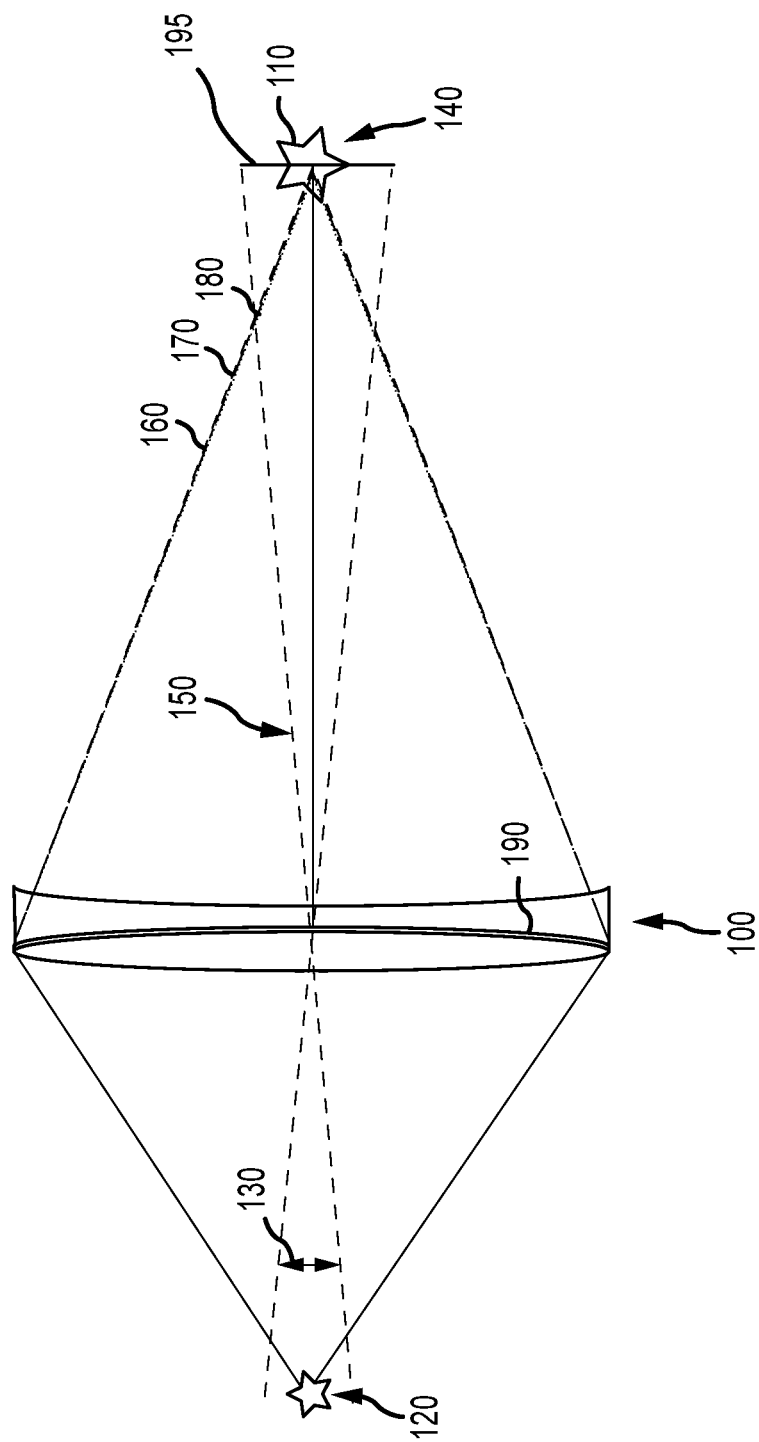
FIGS. 2a through 2c illustrate chromatic aberration for uncorrected, corrected, and aberration enhanced configurations of the objective optical system.
Figure 2B:
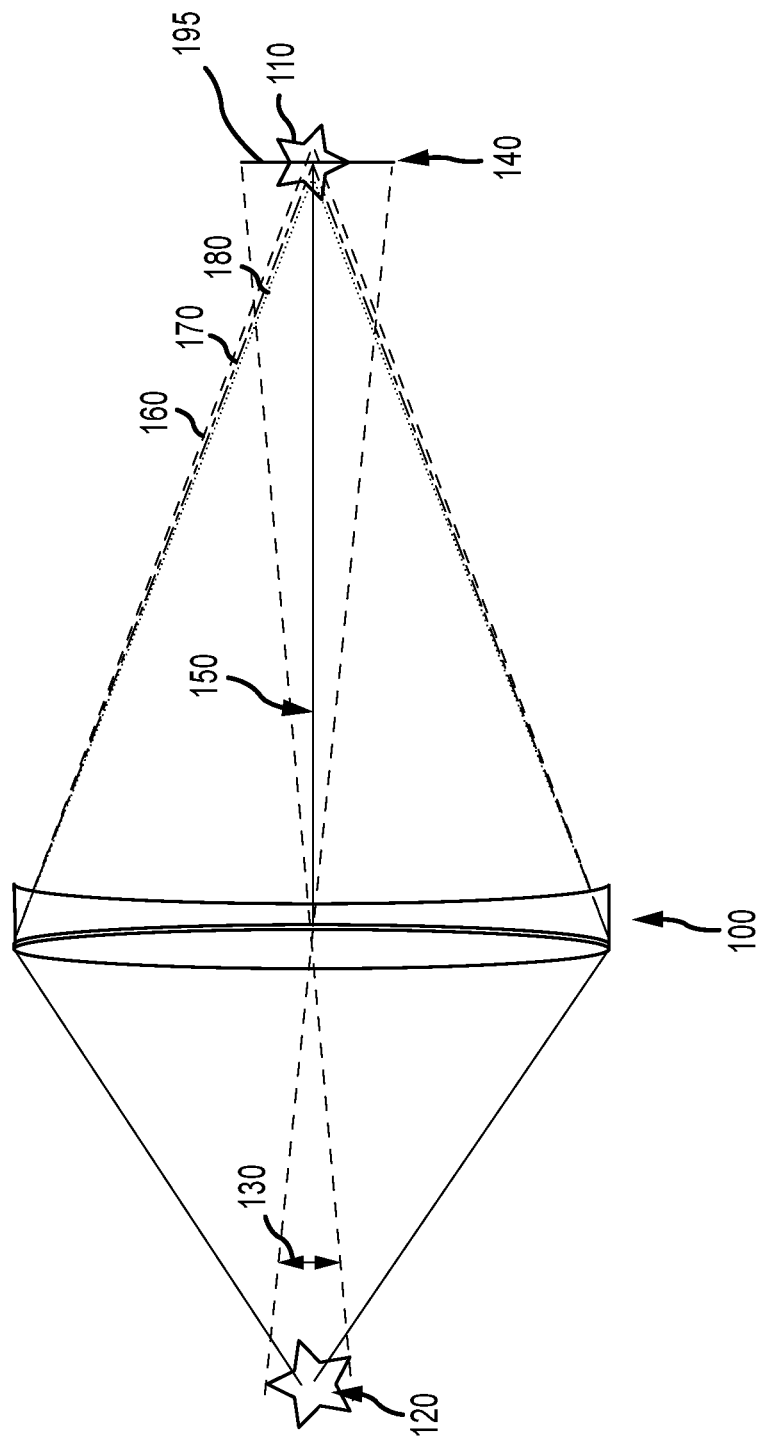
Figure 2C:
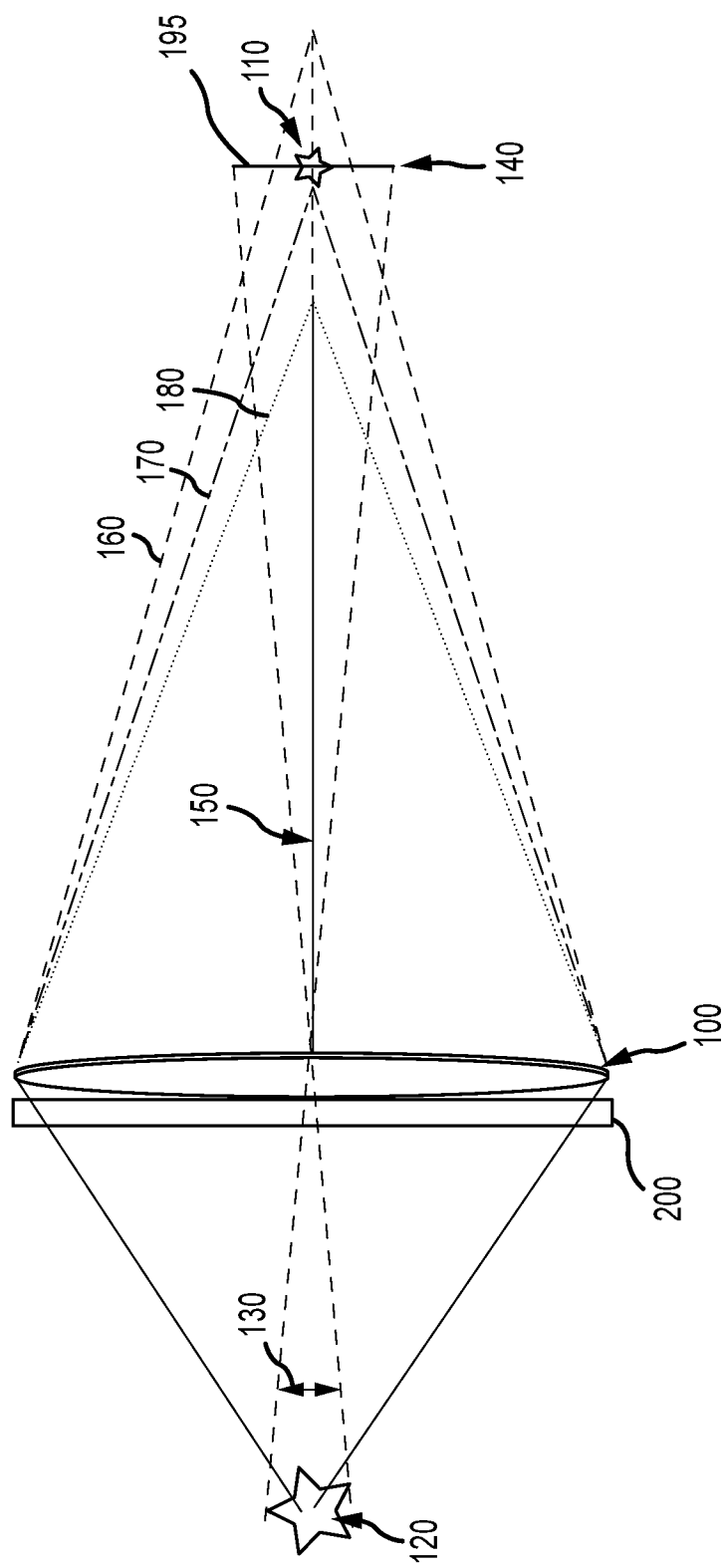

Corrected, uncorrected and chromatic aberration enhanced objective optical systems are illustrated in FIGS. 2a, 2b and 2c, respectively. An objective optical system 100 forms a 2D image 110 of a target 120 within a field of view (FOV) 130 at nominally a prime axial focus position 140 on an optical axis 150 from incident optical radiation simultaneously collected within that FOV. As shown in FIG. 2a, in a standard achromatic design, objective optical system 100 is corrected to yield a transverse chromatic achromatic aberration of no worse than f/2000 at the prime axial focus position. For example, in a visible band system red, green and blue rays 160, 170 and 180, respectively, exhibit minimal separation along optical axis 150 about the prime axial focus position 140. Consequently, placement of a broadband detector 195 at the prime axial focus position produces a full spatial resolution gray-scale image. For example, objective optical system 100 may comprise a "doublet" 190 that couples glasses with disparate powers and dispersion (negative and positive powered lenses bonded together). As shown in FIG. 2b, objective optical system 100 is uncorrected and yields a transverse chromatic achromatic aberration of no better than f/100 at the prime axial focus position. Consequently, the red, green and blue rays 160, 170 and 180, respectively, exhibit sufficient separation along optical axis 150 about the prime axial focus position 140 to provide a change in spatial image contrast as a function of position along the optical axis. Placement of a broadband detector at the axial focus positions for the red, green and blue rays, respectively, produces a spectrally-weighted image component at each position that is somewhat degraded. As shown in FIG. 2c, a chromatic aberration enhancing device (CAED) 200 is placed in the optical path to further degrade the chromatic aberration of the system. The objective optical system may be corrected or uncorrected. In this example, the chromatic aberration is approximately f/3 at the prime axial focus position. This increases the separation of the spectral content e.g. the red, green and blue rays 160, 170 and 180, respectively, along optical axis 150. Increased separation makes it easier to detect the different spectrally-weighted components. The trade for this is more blur and degradation of the image components and composite gray-scale image depending on the spectral composition of the image itself.

A diffractive optical element uses the wave properties of electromagnetic radiation to modify the propagation of that energy. Due to its dependence on the wave nature of radiation, longer wavelengths are diffracted at larger angles. This diffractive behavior can be used to design a lens-like object that is able to create an image, with the caveat that the properties of that lens change as a function of wavelength. In many optical systems this behavior is utilized to correct for the dispersion found in normal glass lens elements and create a color-corrected optical system. If however, we look at this behavior from another perspective, we can use the same physical behavior to exacerbate axial chromatic aberration. In fact because a diffractive optical element has a focal length inversely proportional to wavelength, a diffractive optical element makes an excellent chromatic aberration enhancing device. There are several different types of diffractive optical elements, ranging from a simple binary amplitude mask (known as a Fresnel zone plate), to a complex phase dependent shape often referred to as a kinoform. In the case of the Fresnel zone plate, concentric circles of alternating fully transparent and fully opaque apertures are designed to create a superposition of the transmitted waves at the desired focal length (again for one particular wavelength).

Figure 3:
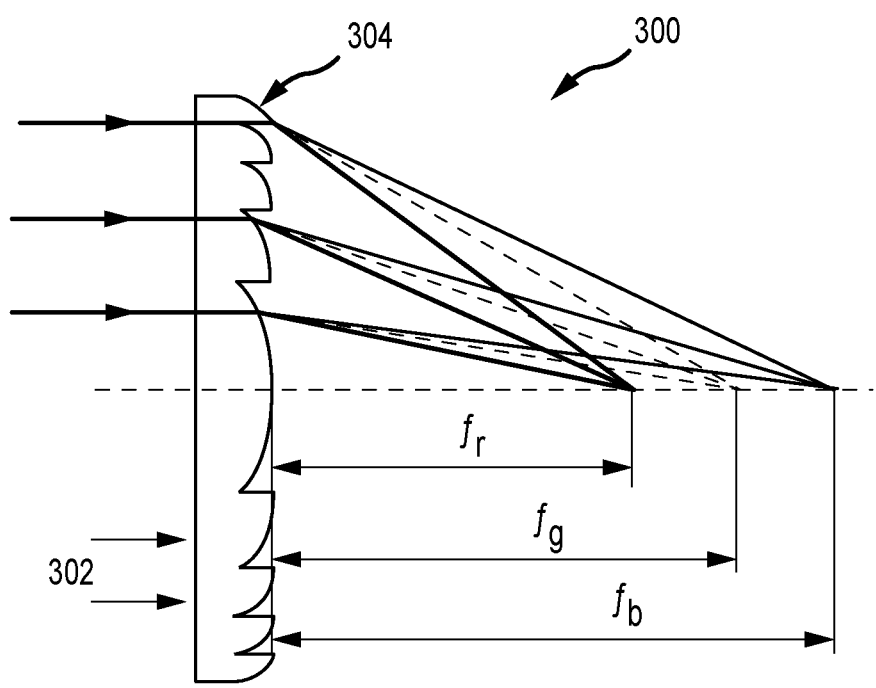
FIG. 3 is an embodiment of a chromatic aberration enhancing device in the form of a kinoform gray-scale diffractive optical element.

As shown in FIG. 3, in the case of the kinoform design, concentric zones 302 with surface relief profiles 304 of continuous phase, create a condition where the superposition of all the different zones create an image at the desired focal plane. There are several benefits to the kinoform approach, one of the primary being that nearly all incident light is transmitted (beyond normal surface reflections that occur with all refractive systems). There is a relatively simple relationship, between the wavelength, desired focal distance, number of continuous surface relief zones, and aperture size of the element: $f=D^2/(8*N_k*\lambda)$ where f is the desired focal length, D is the diameter of the kinoform, $N_k$ is the number of kinoform zones, and $\lambda$ is the wavelength the system is designed for. The red, green and blue focal lengths $f_r$, $f_g$ and $f_b$ are illustrated in the drawing. Given the context of the current invention, the inverse dependence on wavelength and relatively easy manufacturing of kinoforms make them a clear choice for a chromatic aberration enhancing device. With the simple mathematical relationship we can easily map detector positions to the wavelength associated with high spatial image contrast for any given image frame.

Referring now to FIG. 4, we show notional images 400, 410 and 420 for a point source at specific image plane positions corresponding to the primary red, green, and blue prime focus planes. In each figure, corresponding to the different axial focus planes, four contours are displayed. Note, the only contour that is actually detected by the broadband detector is the black contour; the red, green and blue contours represent the actual spectral content of the image and target and are depicted for purposes of illustration. The broadband detector does not discriminate between R, G or B light. In each image, an "image pedestal" is created from the out of focus spectral components around an image created from the in focus spectral component. For example, when the axial focus position corresponds to the "red" wavelength, the red contour should be a tight spot while the blue and green contours, which are somewhat out of focus, should be bigger circles.

In each case a contour is intended to show the region of the point source image corresponding to 20% of the peak signal (nominally centered). The red contour denotes the 20% peak signal outline for incident electromagnetic radiation in the red region of the visible spectrum (approximately 620-750 nm). The green contour denotes the 20% peak signal outline for incident electromagnetic radiation in the green region of the visible spectrum (approximately 495-570 nm). The blue contour denotes the 20% peak signal outline for incident electromagnetic radiation in the blue region of the visible spectrum (approximately 450-495 nm). The black contour denotes the integration of the entire spectrum and is intended to represent a 20% peak signal contour for a gray-scale image.

Starting with FIG. 4a, the detector is positioned with respect to the objective optical system at the axial focus position for the red spectrum of the visible light. In this condition, the 20% contour 402 for the red signal is small and focused as expected. With uncorrected and/or enhanced chromatic aberration, the green and blue portions of the visible spectrum are clearly out of focus, producing much larger 20% energy contour circles 404 and 406 for their respective wavelengths. The black contour 408 is slightly larger than the blue contour indicating that the spectral components of the target largely consist of blue and green wavelengths. Moving to FIG. 4b, the detector is positioned with respect to the objective optical system at the axial focus position for the green spectrum of visible light. In this condition, the 20% contour 412 for the green signal is small and focused as expected. With uncorrected and/or enhanced chromatic aberration, the blue and red portions of the visible spectrum are clearly out of focus, producing much larger 20% energy contour circles 414 and 416 for their respective wavelengths. The black contour 418 is slightly larger than the blue contour indicating that the spectral components of the target largely consist of blue wavelengths. Moving to FIG. 4c, the detector is positioned with respect to the objective optical system at the axial focus position focus for the blue spectrum of visible light. In this condition, the 20% contour 422 for the blue signal is small and focused as expected. With uncorrected and/or enhanced chromatic aberration, the green and red portions of the visible spectrum are clearly out of focus, producing much larger 20% energy contour circles 424 and 426 for their respective wavelengths. The black contour 428 is slightly larger than the blue contour indicating again that the spectral components of the target largely consists of blue wavelengths.

In all of these cases the system only measures the integrated spectrum denoted by the black 20% energy contour for the entire integrated spectral signal. However, as shown in the series of detector positions in FIG. 4a-c, the integrated spectral signal 20% energy contour (black circle) changes as a function of position and clearly shows the content of the scene is primarily blue. The detector outputs an electrical signal representative of an entire image frame. The electrical signal is temporally encoded by the at least two different axial focus positions and a corresponding image frame. The electrical signal is processed to compute a relative spatial image contrast metric. Any form of an image resolution metric can be used in conjunction with detector position to build a hyperspectral response curve for a localized region of the image (in this case a point source target). The resolution of the hyperspectral response curve will depend on the number of distinct detector positions utilized.

Figure 6:
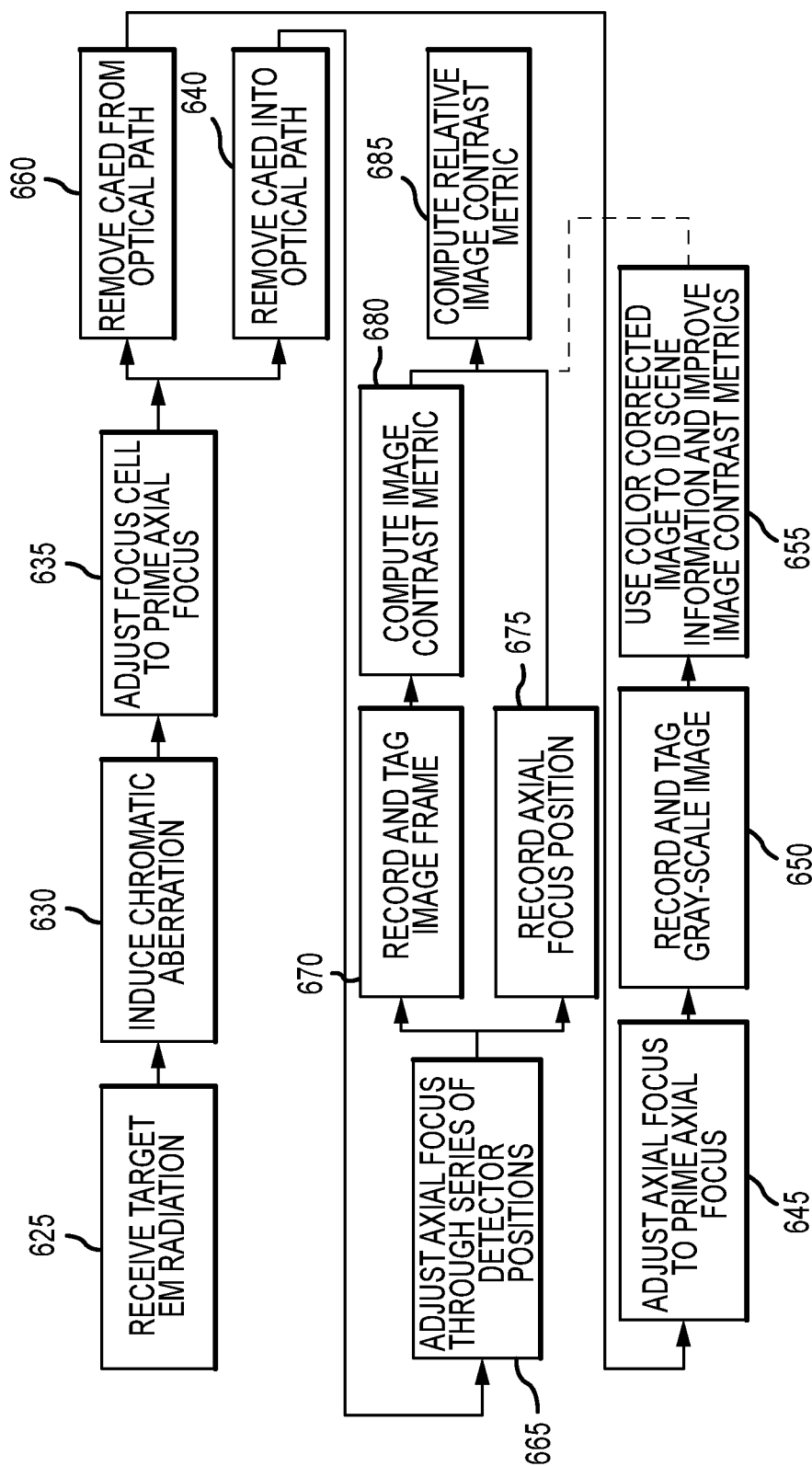
FIG. 6 is a flow diagram of an embodiment of a method of controlling the spectrally-scanned hyperspectral EO sensor to produce a hyperspectral image and compute relative spatial image contrast.

FIGS. 5a-5b and 6 depict an embodiment of a dual-mode gray-scale and hyperspectral EO sensor 500 and method of operation for alternately producing a single full spatial resolution gray-scale image and multiple spectrally-weighted images at different focus wavelengths. EO Sensor 500 includes an objective optical system 510 that forms an image 515 of a 2D target 520 on an optical axis 530 from incident optical radiation simultaneously collected within a field of view (FOV). This particular objective optical system is "achromatic" exhibiting axial chromatic aberration of at most f/2000 where f is a prime axial focus position of the objective. A broadband detector 540 is positioned via mount 550 along the optical axis at nominally the prime axial focus position and converts incident optical radiation into an electrical signal representative of an entire image frame and with the axial focus position and image frame time.

A mechanism 560 is configured to move a chromatic aberration enhancing device (CAED) 570 in and out of an optical path along the optical axis. CAED 570 is configured to induce an axial chromatic aberration of at least f/100 and preferably greater than f/30 to separate spectral components e.g., red 580, green 590 and blue 600 of the incident optical radiation in the FOV along the optical axis thereby providing a change in spatial image contrast as a function of position along the optical axis.

A focus cell 610 is configured to temporally adjust a relative axial focus position of the objective optical system 510 with respect to detector 540. The focus cell 610 may be a mechanical stage configured to translate either or both of the objective optical system and detector along the optical axis. Detector 540 exhibits a bandwidth that spans the spectral content over the range of axial focus positions.

A processor 620 such as provided by a computer is configured to issue electrical signals 630 to command mechanism 560 to move CAED 570 in and out of the optical path and electrical signals 640 to command focus cell 610 to adjust the relative axial focus position and to receive electrical signals 650 from detector 520. In a gray-scale mode, processor 620 issues commands to move CAED 570 out of the optical path and to adjust the relative focus to the prime focus position and receives electrical signals is encoded with a single gray-scale image frame. In a hyperspectral mode, processor 620 issues commands to move CAED 570 into the optical path and to temporally adjust the relative focus to at least two different axial focus positions and receives electrical signals encoded with multiple image frame corresponding to different spectrally-weighted components. Processor 620 computes a relative spatial image contrast metric as a function of encoded focus cell position and the prime focus position for a component of the spectral distribution of the incident optical radiation. This processing transforms changes in spatial resolution, due to artificially enhanced chromatic aberration, into a measure of spectral content in the image.

In general, objective optical system 520 can be any form of imaging optic system, from a single lens or mirror to a multi-element optical system that corrects a variety of standard optical aberrations. The primary function is to transform electromagnetic radiation that is incident to the objective optical system at an angle into a position in the image plane. For an object that is an infinite distance or approximates an infinite distance away from the objective optical system this transformation is governed to first order by a simple relationship: y=f*tan(theta), where y is the displacement of the electromagnetic radiation from the optical axis, f is the focal length of the objective optical system, and theta is the angle of the incident electromagnetic radiation. In the case of an entire imaged scene, the detector dimensions (nominally placed at the prime focus of the objective optical system) define the maximum spatial displacement that can be sensed and due to the standard transformation, the maximum off-axis angle of incident electromagnetic radiation. This maximum angle defines the field of view (FOV) of the system.

In this dual-mode embodiment, the objective optical system is achromatic (chromatic aberration<f/2000) in order to produce the full-resolution corrected gray-scale image. In a dedicated hyperspectral EO sensor embodiment, the objective optical system may be achromatic with a fixed CAED or may be an uncorrected system with or without a CAED as long as the system chromatic aberration is at least f/100. In a dedicated EO sensor, the processor can integrate the spectrally-weighted image components to produce an estimate of the full-resolution gray-scale image.

As shown in FIG. 6, an embodiment of a method for operating the dual-mode sensor includes receiving the emission or reflection of electromagnetic radiation from target with both spectral and spatial (step 625), injection of chromatic aberration via CAED (step 630), to create a wavelength dependent axial focus and the placement of the prime axial focus of a center wavelength in a band of interest at the center of the focus cell travel (step 635). In gray-scale mode, the processor commands the mechanism to remove the CAED from the optical path (step 640), commands the focus cell to adjust the relative axial focus position to the prime axial focus position (step 645) and record the image and CAED position (step 650). Optionally, the processor may use a color corrected image to identify scene information and improve scene contrast estimates (step 655).

In hyperspectral mode, the processor commands the mechanism to place the CAED into the optical path (step 660) and then commands the focus cell to move the relative axial focus position through a series of two or more image focus planes (step 665). At each focus position, the processor records the image frame and assigns a time tag, frame number and CAED position (step 670) and records the relative axial focus position with a time tag (step 675). The processor computes a spatial image contrast metric for each image frame (e.g. a blur function for point targets) (step 680). After image frames are recorded for the series of focus cell adjustments, the processor computes a relative spatial image contrast metric from each frame across all recorded frames (step 685). The processor may also integrate the image frames (different spectrally-weighted components) to produce an estimate of the gray-scale image.

The relative spatial image contrast metric transforms changes in spatial resolution, due to artificially enhanced chromatic aberration, into a measure of spectral content in the image. This metric can take many different forms.

Figure 7:
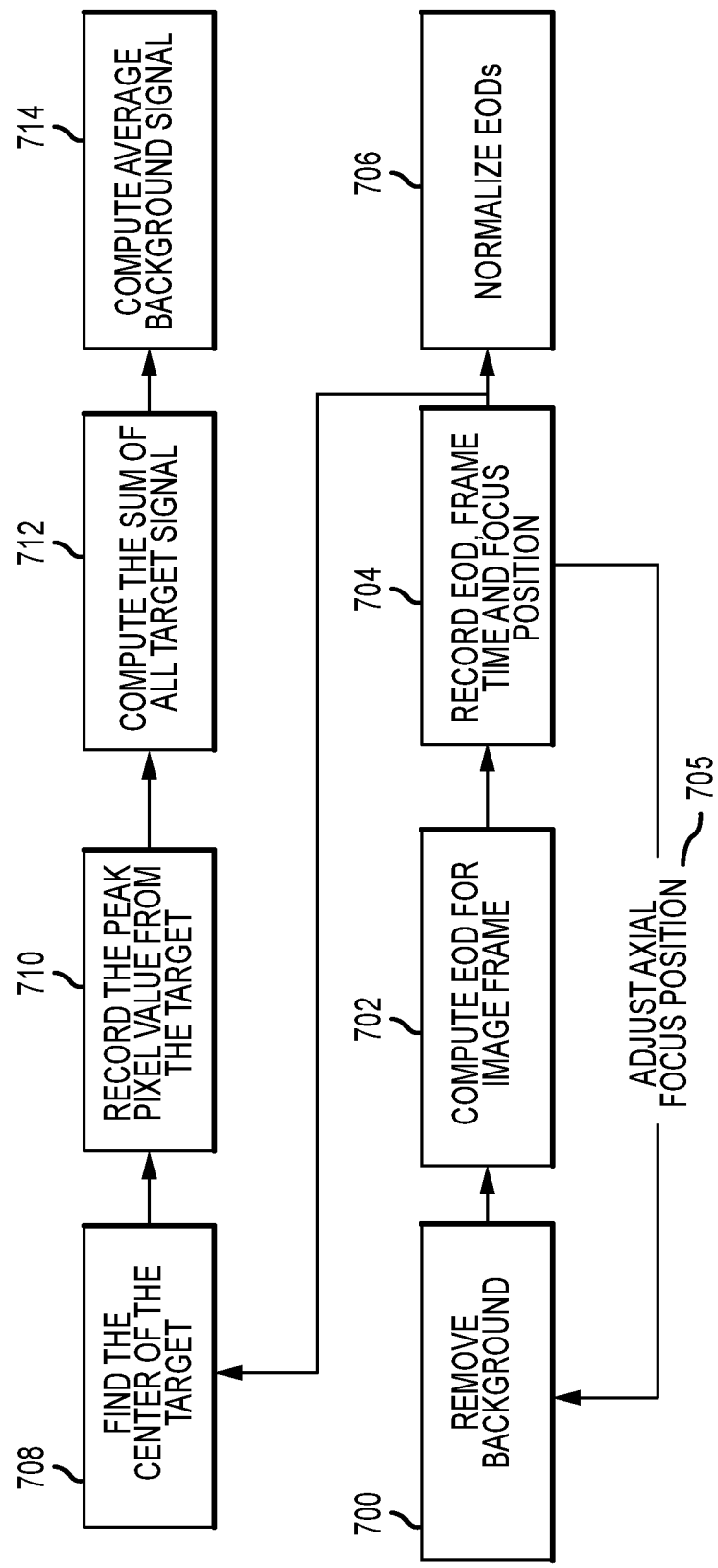
FIGS. 7 and 8 are flow diagrams for computing relative spatial image contrast as a measure of energy on detector (EOD) or relative image blur in different sub-regions as a function of focus cell position, respectively.
Figure 8:
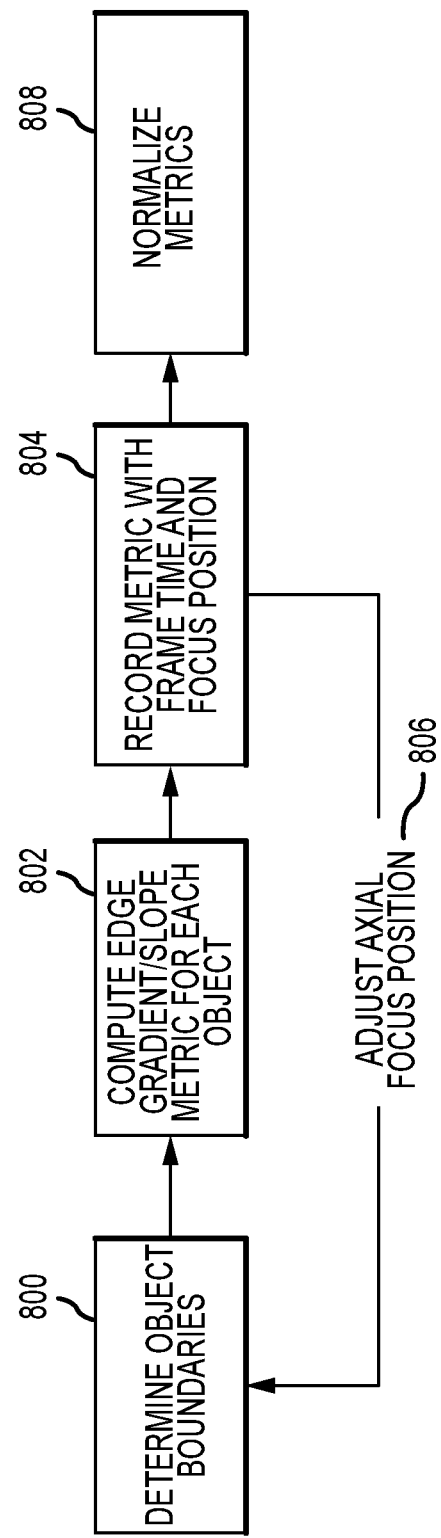

In an embodiment, the processor is configured to compute the relative spatial image contrast metric as a measure of energy on detector (EOD), which is a standard measure of image blur for point source objects, as a function of focus cell position. As shown in FIG. 7, in an implementation the processor is configured to subtract the background signal level from the peak pixel value as well as the N×N sum (mean background subtracted from each N×N pixel) (step 700). The processor computes the ratio of the background subtracted peak pixel value to the surrounding N×N region to provide the EOD (measure of blur) for an image frame (step 702). The processor records the EOD associated with the frame time and axial focus position for comparison to subsequent image frames (step 704). The relative axial focus position is incremented and steps 700, 702 and 704 are repeated (step 705). The processor normalizes the EODs to their peak responses as a function of wavelength (mapped via focus position and known chromatic aberration) to measure the spectral content of the source (step 706). Additionally, the processor identifies a point source target (center of the target) above the background in the image (step 708), determines the peak pixel value (step 710), computes the sum of all pixel values in a N×N region (e.g. 5×5) about the peak pixel (step 712), and computes the sum of all pixel values outside the N×N region out to a larger M×M region (e.g., 21×21) and divide by the number of pixels summed to measure an average background signal (step 714). The average background signal is subtracted from the target signal to accurately determine the ratio between the peak of the target and surrounding blur form the target In another embodiment, the processor is configured to compute the relative spatial image contrast metric by segmenting the image into multiple sub-regions and encoding the sub-regions by measuring a relative image blur in each sub-region as a function of the focus cell's axial prime focus position. As shown in FIG. 8, in an implementation a processor is configured to determine object boundaries in an image via an image segmentation algorithm utilizing at least one or more image frames (step 800). For each identified object, the processor computes an edge gradient/slope metric as a measure of blur (step 802). The processor records the metric associated with each object at the frame time and axial focus position for comparison to subsequent image frames (step 804). The focus cell adjusts the axial focus position (step 806) and the processor repeats steps 800, 802 and 804. The processor normalizes the metrics to their peak response as a function of wavelength (mapped via focus position and known chromatic aberration) to measure the spectral content of each object (step 808).

In an embodiment, the processor is configured to compute the relative spatial image contrast metric to estimate a temperature of an object in the sensor FOV, assuming the target's spectral emissions are driven by Planck's Blackbody Radiation law.

In another embodiment, the processor is configured to build (integrate) spectral content from the plurality of image frames to form an estimate of a gray-scale image. This estimate is somewhat degraded (blurred) as compared to the single gray-scale image produced with an achromatic objective optical system.

A CAED may be permanently, temporarily or switchably mounted to retrofit a system with an existing gray-scale EO sensor to form a hyperspectral EO sensor. The ability to retrofit existing EO sensors is a major advantage over spatially-scanned hyperspectral EO sensors, which cannot be retrofit to existing systems.

Figure 9:
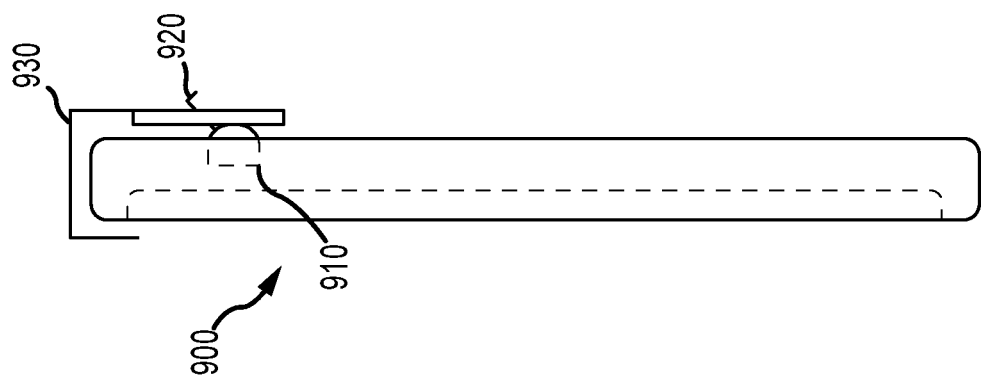

As shown in FIG. 9, an ordinary cell phone 900 can be retrofitted to convert its camera 910 to a spectarally-scanned hyperspectral EO sensor. Camera 910 typically includes an R, G, B filter on each pixel that allows it to detect R, G, and B light. A CAED 920 is affixed to a mount 930 that is configured to snap on and off of cell phone 900 to place CAED 920 in the optical path in front of camera 910. The focus cell resident in the camera is used to spectrally scan the scene as previously described. This dramatically improves the spectral resolution (from the base R, G, B) by scanning intermediate wavelengths as well as possibly extending the band to the natural spectral band of CMOS Si detectors (out to the NIR . . . around 1.064 um vs. red in the 600-700 nm range). Extension of the band would involve removal of a NIR reflection coating these systems typically employ.

Figure 10:
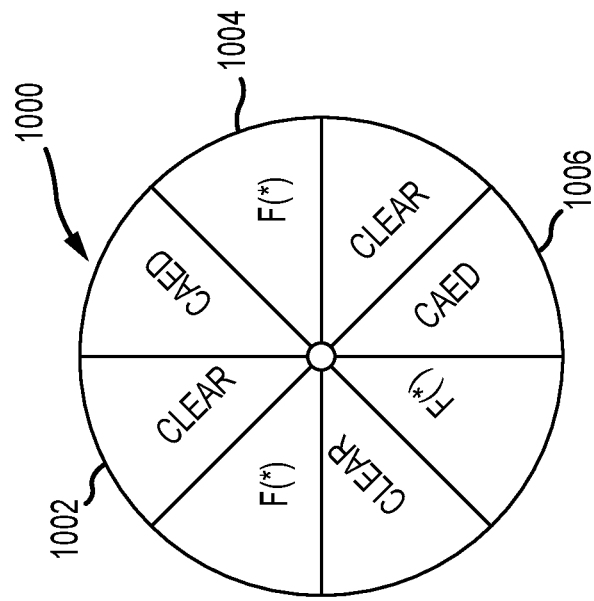
FIGS. 9 and 10 illustrate retrofitting of a cell phone with a clip on CAED and a optical system with a spinning filter wheel with CAED sections to form spectrally-scanned hyperspectral EO sensors.

As shown in FIG. 10, an objective optical system in for example a missile seeker includes a spinning filter wheel 1000, which in its existing configuration includes a number of clear window sections 1002 interleaved with F(*) sections 1004 that perform some optical function. When a clear window section 1002 is in the optical path, the focus cell adjusts the detector position to the prime axial focus position and the system functions as a typical gray-scale EO sensor. To retrofit the system to embody a spectrally-scanned hyperspectral EO sensor, one or more sections, unused or repurposed, are provided with a CAED to form a CAED section 1006. The focus cell adjusts the detector position to synchronize different axial focus positions with CAED sections 1006 being in the optical path to generate different spectrally-weighted image frames.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A spectrally-scanned hyperspectral electro-optic (EO) sensor, comprising an achromatic corrected objective optical system that forms an image on an optical axis from incident optical radiation simultaneously collected within a field of view (FOV), said achromatic corrected objective optical system separating spectral components of the incident optical radiation along the optical axis with an axial chromatic aberration of at most f/2,000 where f is a prime axial focus position;

a chromatic aberration enhancing device configured to separate the spectral components of the incident optical radiation in the FOV along the optical axis, said separation of spectral components by the enhancing device providing a change in spatial image contrast as a function of position along the optical axis;

a mechanism to move the chromatic aberration enhancing device in and out of an optical path along the optical axis;

a detector spaced along the optical axis that converts the incident optical radiation into an electrical signal representative of an entire image frame; and a focus cell configured to temporally adjust a relative axial focus position of the achromatic corrected objective optical system with respect to said detector to at least two different axial focus positions when the enhancing device is in the optical path, wherein said focus cell is configured to adjust relative axial focus to bring the achromatic corrected objective optical system into focus at the prime axial focus position when the enhancing device is out of the optical path, wherein said electrical signal is temporally encoded by the at least two different axial focus positions and a corresponding image frame when the enhancing device is in the optical path, wherein the electrical signal is encoded with a single gray-scale image frame at the prime axial focus position when the enhancing device is out of the optical path.

2. The EO sensor of claim 1, wherein said axial chromatic aberration is at least f/30.

3. The EO sensor of claim 1, wherein said chromatic aberration enhancing device comprises a diffractive optical element.

4. The EO sensor of claim 3, wherein said diffractive optical element comprises a kinoform gray-scale diffractive optical element.

5. The EO sensor of claim 1, wherein said detector comprises a monochromatic imaging detector whose bandwidth spans the spectral components at the different axial focus positions.

6. The EO sensor of claim 1, in which the temporal adjustment of the relative axial focus position constitutes a scanning and the only scanning in the sensor.

7. The EO sensor of claim 1, further comprising:
a processor configured to compute a relative spatial image contrast metric within an image comprising one or more image frames as a function of encoded focus cell position and the prime axial focus position for a component of a spectral distribution of the incident optical radiation.

8. The EO sensor of claim 7, wherein the processor is configured to compute the relative spatial image contrast metric as a measure of energy on detector (EOD) as a function of focus cell position.

9. The EO sensor of claim 7, wherein the processor is configured to compute the relative spatial image contrast metric to estimate a temperature of an object in the sensor FOV.

10. An electro-optic (EO) sensor, comprising
a corrected objective optical system that forms an image along an optical axis from incident optical radiation simultaneously collected within a field of view (FOV), said objective optical system corrected to reduce a separation of spectral components of the incident optical radiation along the optical axis to an axial chromatic aberration of at most f/2,000 where f is a prime focus position;

a chromatic aberration enhancing device configured to separate the spectral components of the incident optical radiation in the FOV along the optical axis with an axial chromatic aberration of at least f/100, said separation of spectral components by the enhancing device providing a change in spatial image contrast as a function of position along the optical axis;

a mechanism configured to move the chromatic aberration enhancing device in and out of an optical path along the optical axis;

a detector spaced along the optical axis that converts the incident optical radiation into an electrical signal representative of an entire image frame; and a focus cell configured to temporally adjust a relative focus of the objective optical system with respect to said detector to at least two different axial focus positions, a processor configured to alternately command the mechanism to move the enhancing device out of the optical path, command the focus cell to adjust the relative focus to the axial focus position and to process the electrical signal to extract a gray-scale image frame, command the mechanism to move the enhancing device into the optical path, command the focus cell to adjust the relative focus to the at least two different axial focus positions and to process the electrical signal, which is temporally encoded by the at least two different axial focus positions and a corresponding image frame, to compute a relative spatial image contrast metric within an image comprising one or more of the image frames as a function of encoded focus cell position and the prime focus position for a component of a spectral distribution of the incident optical radiation.

11. A method of retrofitting an existing gray-scale electro-optic (EO) sensor to be useful as a hyperspectral EO sensor, said gray-scale EO sensor comprising a corrected objective optical system that forms an image on an optical axis from incident optical radiation simultaneously collected within a field of view (FOV), said objective optical system corrected to reduce a separation of spectral components of the incident optical radiation along the optical axis to an axial chromatic aberration of at most f/2,000 where f is a prime focus position, a broadband detector that converts the incident optical radiation into an electrical signal representative of an entire image frame, and a focus cell configured to adjust a relative focus of the objective optical system with respect to said detector to the prime focus position, the method comprising:

placing a chromatic aberration enhancing device in an optical path along the optical axis, said chromatic aberration enhancing device configured to separate the spectral components of the incident optical radiation in the FOV along the optical axis with an axial chromatic aberration of at least f/100, said separation of spectral components by the enhancing device providing a change in spatial image contrast as a function of position along the optical axis;

commanding the focus cell to adjust the relative focus to at least two different axial focus positions;

generating the electrical signal from the broadband detector, which is temporally encoded by at least two different axial focus positions and a corresponding image frame; and processing the electrical signal to compute a relative spatial image contrast metric within an image comprising one or more image frames as a function of encoded focus cell position and the prime focus position for a component of a spectral distribution of the incident optical radiation.

12. The method of claim 11, in which the existing gray-scale EO sensor is useful as a dual-mode gray-scale and hyperspectral EO sensor, further comprising:

configuring a mechanism to alternately move the chromatic aberration enhancing device in and out of the optical path;

commanding the mechanism to move the enhancing device out of the optical path; and generating an electrical signal that is encoded with a gray-scale image frame.

13. The method of claim 11, wherein the existing EO sensor is implemented in a cell phone, wherein the chromatic aberration enhancing device is moveably attached to the cell phone in the optical path to a cell phone camera.

14. The method of claim 12, wherein the mechanism includes a filter wheel that includes a clear window section and an optical function section, wherein the chromatic aberration enhancing device is mounted on a section of the filter wheel.

* * * * *